United States Patent
Line et al.

(10) Patent No.: US 9,981,582 B2
(45) Date of Patent: May 29, 2018

(54) OVERMOLDED TRACK FOR AN INTEGRATED THIGH-EXTENSION OF A VEHICLE SEAT

(71) Applicant: Ford Global Technologies, LLC, Dearborn, MI (US)

(72) Inventors: Johnathan Andrew Line, Northville, MI (US); Marcos Silva Kondrad, Macomb Township, MI (US); Carol Casey, Dearborn, MI (US); Rodney Charles Brinker, Eastpointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 177 days.

(21) Appl. No.: 15/091,803

(22) Filed: Apr. 6, 2016

(65) Prior Publication Data
US 2017/0291520 A1    Oct. 12, 2017

(51) Int. Cl.
| | |
|---|---|
| B60N 2/62 | (2006.01) |
| B29C 43/18 | (2006.01) |
| B29C 45/14 | (2006.01) |
| B29C 49/20 | (2006.01) |
| B29C 65/70 | (2006.01) |
| B60N 2/02 | (2006.01) |
| B29K 705/00 | (2006.01) |
| B29L 31/30 | (2006.01) |
| B29L 31/00 | (2006.01) |

(52) U.S. Cl.
CPC ............... *B60N 2/62* (2013.01); *B29C 43/18* (2013.01); *B29C 45/14336* (2013.01); *B29C 49/20* (2013.01); *B29C 65/70* (2013.01); *B60N 2/0284* (2013.01); *B29K 2705/00* (2013.01); *B29L 2031/30* (2013.01); *B29L 2031/771* (2013.01)

(58) Field of Classification Search
CPC ......................................................... B60N 2/62
See application file for complete search history.

(56) References Cited

U.S. PATENT DOCUMENTS

| | | | |
|---|---|---|---|
| 4,324,431 A * | 4/1982 | Murphy ................. | B60N 2/62 297/284.11 |
| 5,607,204 A | 3/1997 | Gryp | |
| 7,578,554 B2 | 8/2009 | Lee et al. | |
| 7,597,398 B2 | 10/2009 | Lindsay | |
| 7,931,246 B2 | 4/2011 | Brewer et al. | |
| 8,684,462 B2 | 4/2014 | Brewer et al. | |
| 9,039,085 B2 | 5/2015 | Aselage | |
| 9,278,636 B2 | 3/2016 | Duncan et al. | |
| 9,616,776 B1 * | 4/2017 | Kondrad ............. | B60N 2/0284 |
| 2007/0108817 A1 * | 5/2007 | Lee ........................ | B60N 2/62 297/284.11 |
| 2008/0148522 A1 * | 6/2008 | Beshore ................ | A47B 91/06 16/42 R |
| 2008/0231099 A1 | 9/2008 | Szczepkowski et al. | |
| 2009/0261635 A1 * | 10/2009 | Yamaguchi .......... | B60N 2/4885 297/216.12 |

(Continued)

*Primary Examiner* — Timothy J Brindley
(74) *Attorney, Agent, or Firm* — Vichit Chea; Price Heneveld LLP

(57) ABSTRACT

A thigh-extension for a vehicle seat includes a metallic thigh-extension plate, an extension track defined by a low-friction resin overmolded onto the thigh-extension plate and a thigh-extension slider having an integral groove slidably engaged with the extension track to define a plurality of thigh-extension positions.

19 Claims, 8 Drawing Sheets

(56) References Cited

U.S. PATENT DOCUMENTS

| | | | |
|---|---|---|---|
| 2013/0119743 A1* | 5/2013 | Evans | B60N 2/68 297/452.18 |
| 2014/0203617 A1* | 7/2014 | Line | B60N 2/4495 297/423.29 |
| 2015/0061343 A1* | 3/2015 | Duncan | B60N 2/62 297/423.19 |
| 2015/0258914 A1* | 9/2015 | Lee | B60N 2/0284 297/284.11 |
| 2016/0029812 A1* | 2/2016 | Terhune | A47D 1/004 297/153 |
| 2016/0090010 A1* | 3/2016 | Line | B60N 2/0284 297/284.3 |
| 2017/0210262 A1* | 7/2017 | Line | B60N 2/06 |
| 2017/0210263 A1* | 7/2017 | Line | B60N 2/62 |
| 2017/0291521 A1* | 10/2017 | Line | B60N 2/02 |

\* cited by examiner

OVERMOLDED TRACK FOR AN INTEGRATED THIGH-EXTENSION OF A VEHICLE SEAT

FIELD OF THE INVENTION

The present invention generally relates to vehicle seats, and more specifically, an integrated track system for an operable thigh-extension for a vehicle seat.

BACKGROUND OF THE INVENTION

Current vehicle seats include numerous adjustment points that provide for varying seat configurations to the user. Each of these adjustment points includes a specific operating mechanism that allows for movement of components of the seat between the various positions. Certain components of the vehicle seat include a sliding interface that allows for lengthening and shortening of components of the vehicle seat. Such components can include a thigh-extension or separate right and left thigh-extensions that can be extended and retracted as desired by the user.

SUMMARY OF THE INVENTION

According to one aspect of the present invention, a vehicle seat includes a seat frame, a first thigh-extension plate coupled to the seat frame, wherein the first thigh-extension plate includes a first pair of inner and outer extension tracks overmolded onto a portion of the first thigh-extension plate. A first thigh-extension slider is engaged with the first thigh-extension plate, wherein the first thigh-extension slider defines inner and outer grooves that slidably engage the inner and outer extension tracks, respectively, of the first thigh-extension plate to define a plurality of first thigh-extension positions.

According to another aspect of the present invention, a thigh-extension for a vehicle seat includes a metallic thigh-extension plate, an extension track defined by a low-friction resin overmolded onto the thigh-extension plate and a thigh-extension slider having an integral groove slidably engaged with the extension track to define a plurality of thigh-extension positions.

According to another aspect of the present invention, a method of forming a thigh-extension for a vehicle seat includes overmolding a low-friction resin onto a metallic thigh-extension plate to define inner and outer extension tracks and sliding a nylon thigh-extension slider onto the inner and outer thigh-extension tracks, wherein the thigh-extension slider includes inner and outer grooves that slidably engage the inner and outer extension tracks, respectively.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
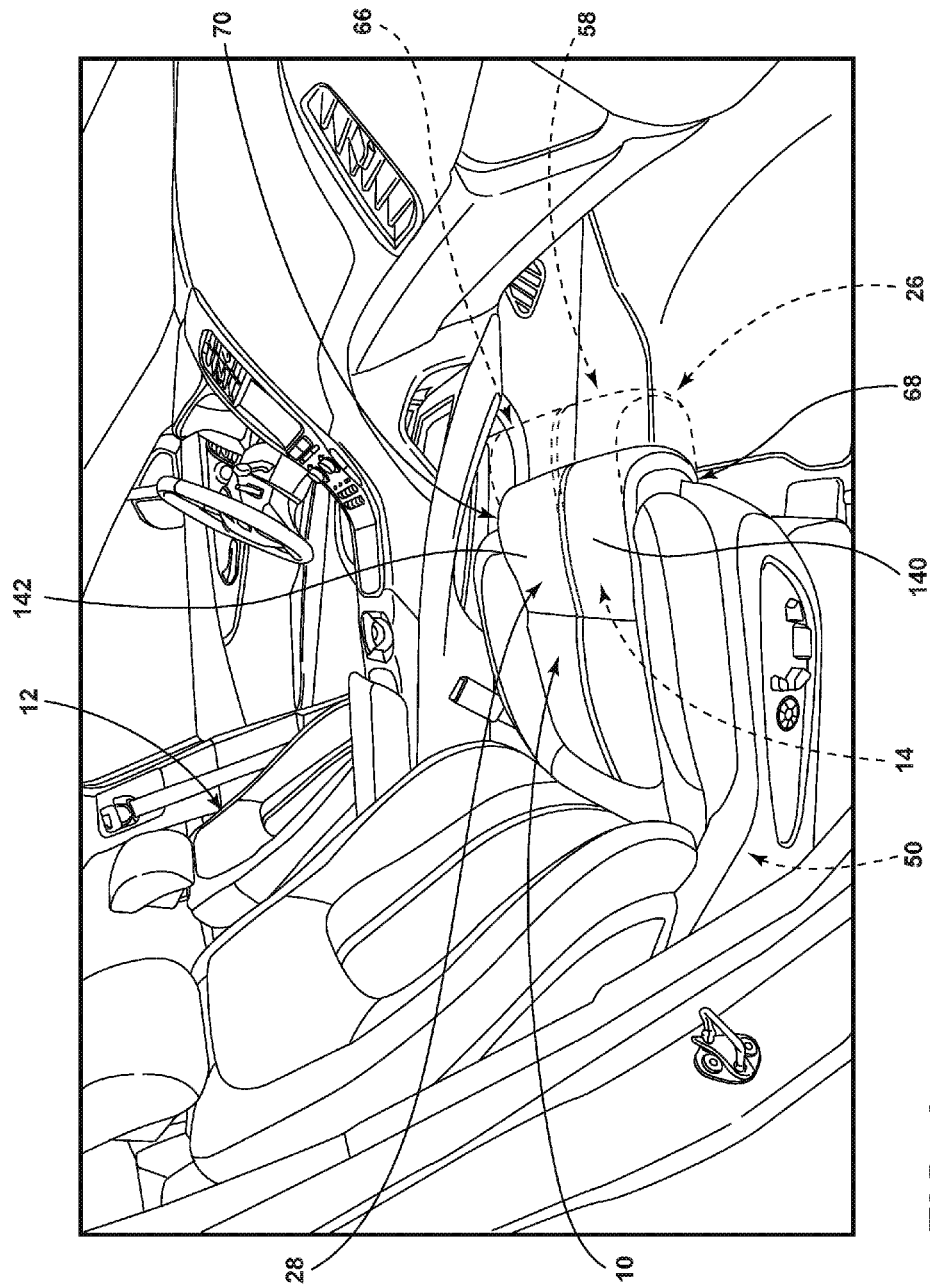
FIG. 1 is a side perspective view of a passenger cabin of a vehicle illustrating vehicle seats that incorporate an aspect of the overmolded track for the integrated thigh-extension.
Figure 2:
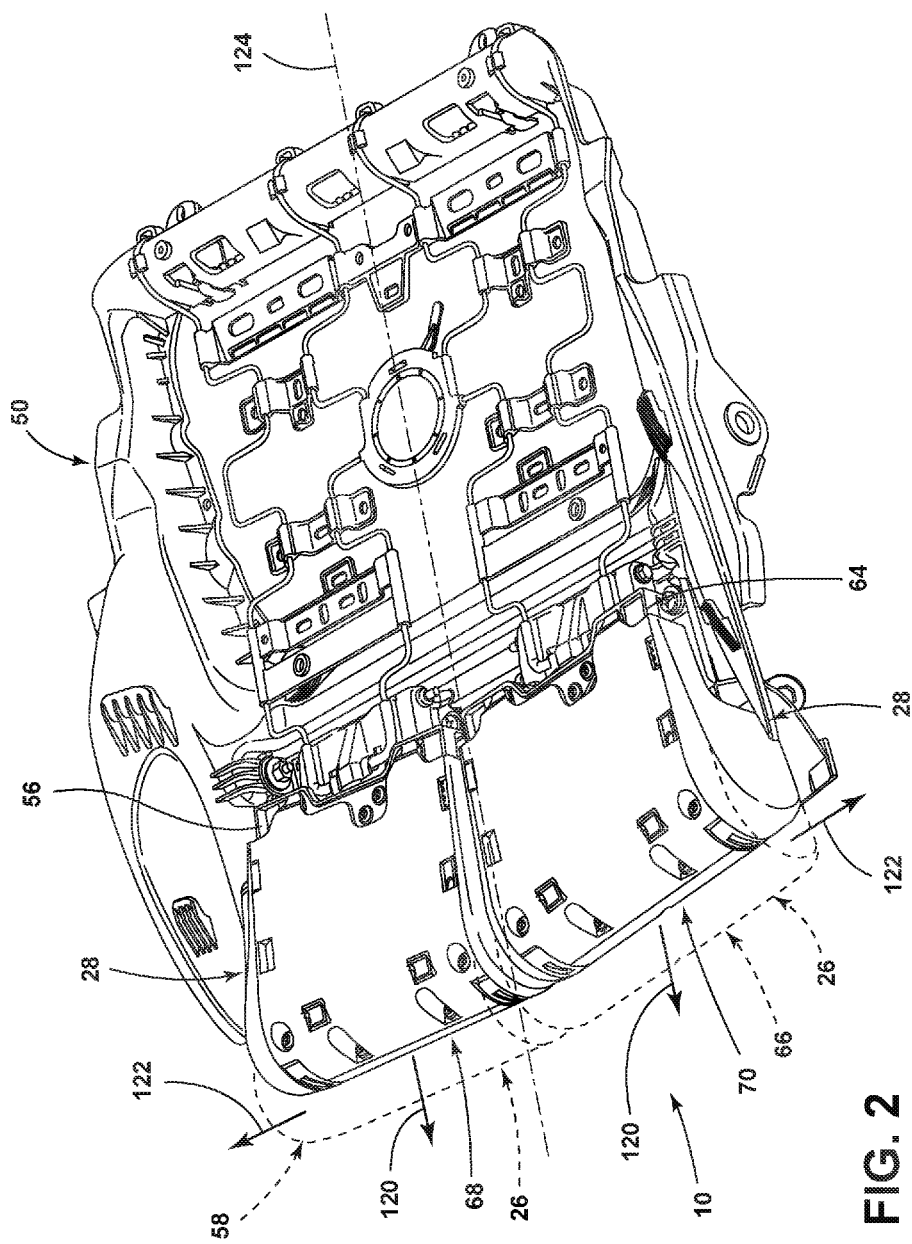
FIG. 2 is a top perspective view of a seat frame having right and left thigh-extensions incorporating the overmolded track attached thereto.
Figure 3:
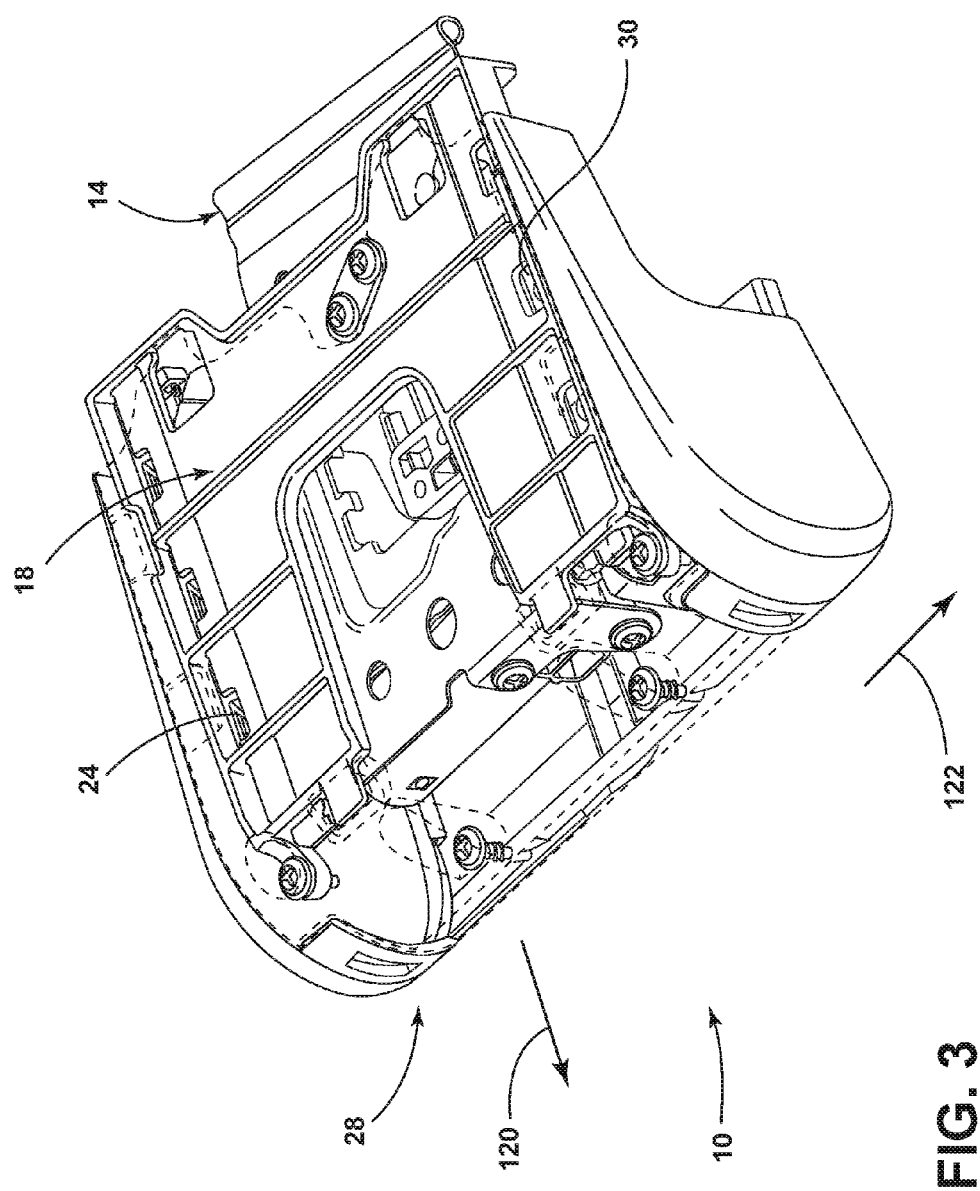
FIG. 3 is a top perspective view of an aspect of a thigh-extension for incorporation into a vehicle seat, with the thigh-extension in a retracted position.
Figure 4:
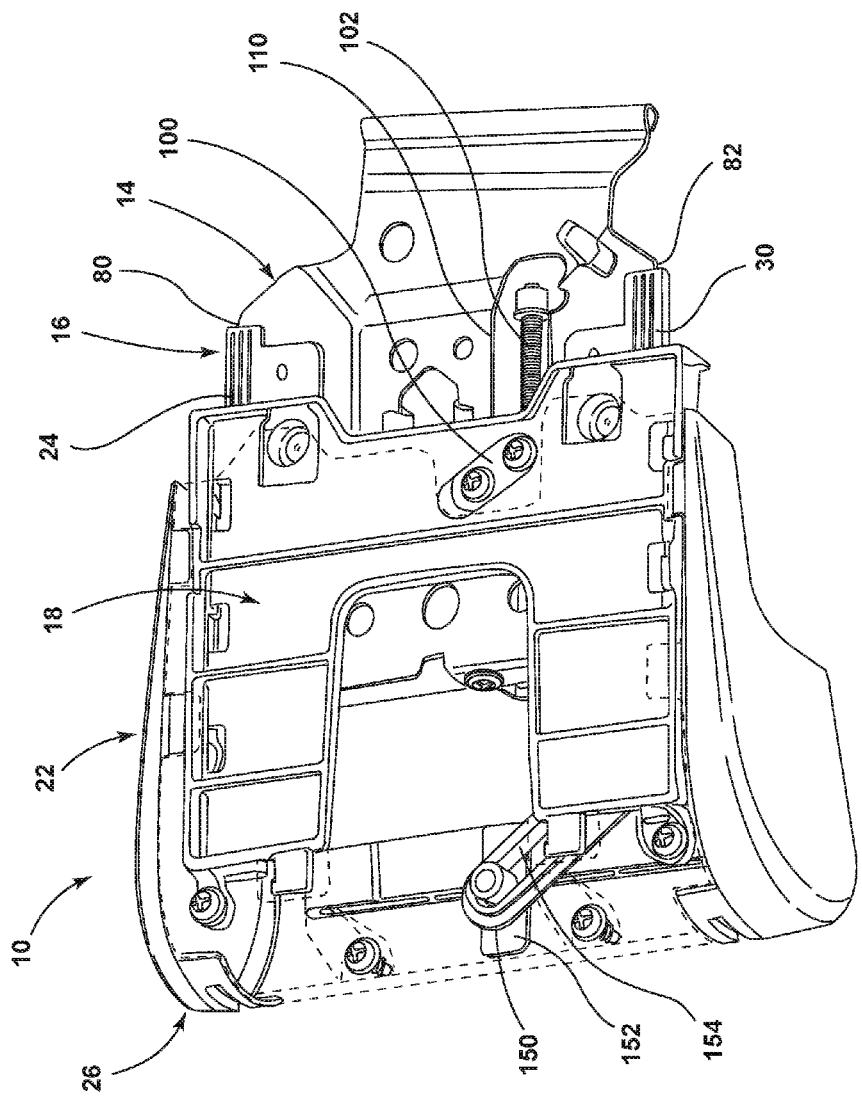
FIG. 4 is a top perspective view of the thigh-extension of FIG. 3 with the thigh-extension in an extended position.
Figure 5:
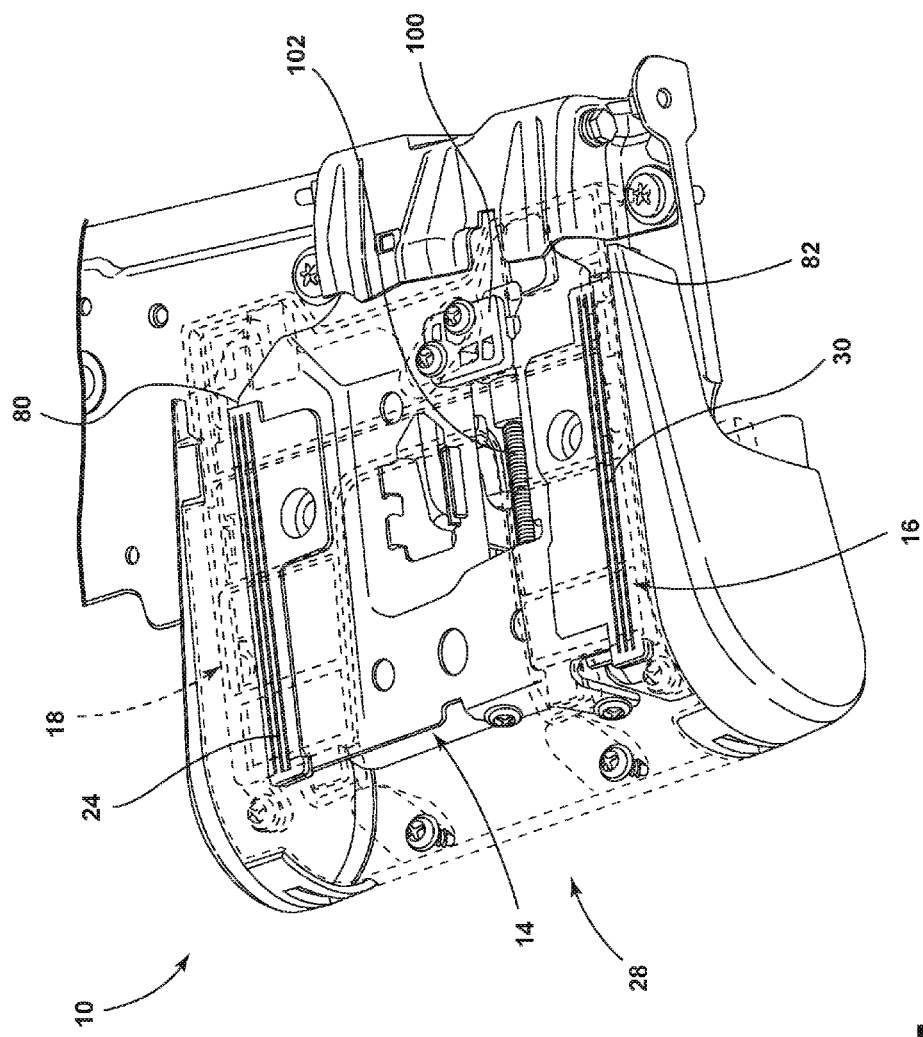
FIG. 5 is a top perspective view of a portion of a seat frame with an aspect of the thigh extension having the overmolded track incorporated therein.
Figure 6:
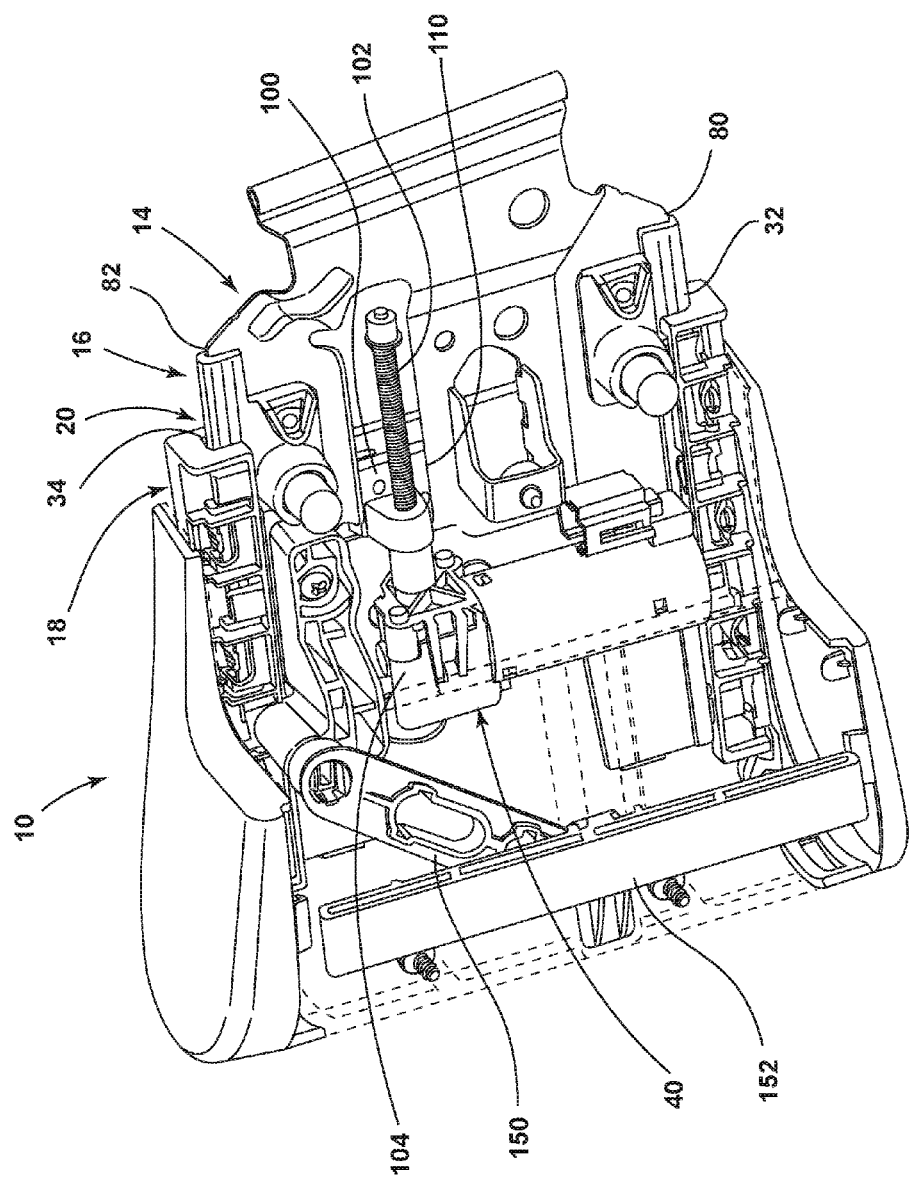
FIG. 6 is a bottom perspective view of the thigh-extension of FIG. 3, with the thigh-extension in an extended position.
Figure 7:
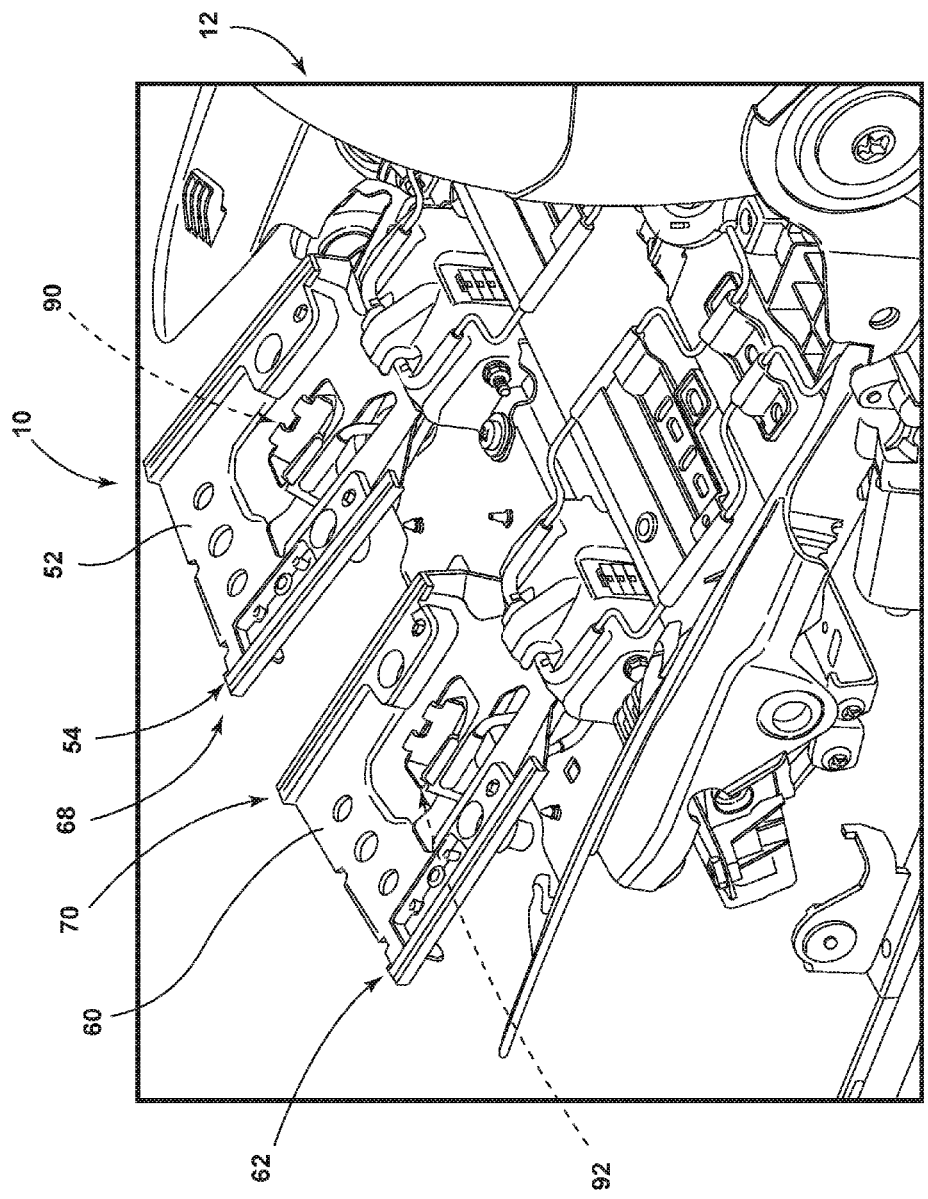
FIG. 7 is a top perspective view of a seat frame for a vehicle seat incorporating the thigh-extension plates having the overmolded track.
Figure 8:
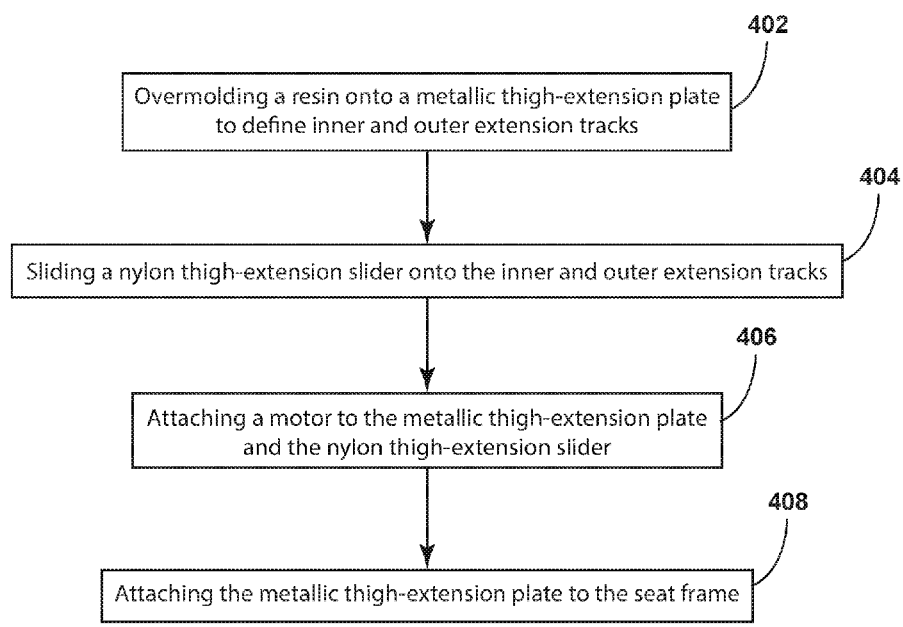
FIG. 8 is a schematic flow diagram illustrating a method for forming a thigh-extension for a vehicle seat.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-7, reference numeral 10 generally refers to a thigh-extension for a vehicle seat 12. The thigh-extension 10 can be incorporated within a vehicle seat 12, where the thigh-extension 10 includes a metallic thigh-extension plate 14. An extension track 16 is defined by a low-friction resin that is overmolded onto the thigh-extension plate 14. A thigh-extension slider 18 having an integral groove 20 is slidably engaged with the extension track 16 to define a plurality of thigh-extension positions 22 of the thigh-extension slider 18 with respect to the metallic thigh-extension plate 14, including extended and retracted positions 26, 28 and various positions therebetween. It is contemplated that the extension track 16 can include inner and outer extension tracks 24, 30 that slidably engage respective inner and outer grooves 32, 34 defined within the thigh-extension slider 18. It is contemplated that the low-friction resin used to define the extension track 16 can be made of various polymers that can include, but are not limited to, acetyl. Additionally, the thigh-extension slider 18 can made up of various components that can include, but are not limited to, glass-filled nylon and more specifically, 15 percent glass-filled nylon.

Referring again to FIGS. 1-7, it is contemplated that the thigh-extension 10 can include a motor 40 that is coupled to the thigh-extension slider 18 and the thigh-extension plate 14. The motor 40 connected thereto can be configured to selectively operate the thigh-extension slider 18 between the plurality of thigh-extension positions 22 relative to the thigh-extension plate 14. It is contemplated that the motor 40 can be any one of various motors that can include, but are not limited to, a screw drive motor, a chain-drive motor, combinations thereof, and other similar motors 40. It is also contemplated that the operation of the thigh-extension slider 18 between the plurality of thigh-extension positions 22 can be operated by various mechanisms that can include, but are not limited to, hydraulic mechanisms, pneumatic mechanisms, combinations thereof, such mechanisms incorporated within various motor assemblies, and similar other operating mechanisms.

Referring again to FIGS. 1-7, it is contemplated that the vehicle seat 12 can include a single thigh-extension 10, or can include multiple thigh-extensions 10. Where multiple thigh-extensions 10 are included, the vehicle seat 12 can include a seat frame 50 and a first thigh-extension plate 52 that is coupled to the seat frame 50. The first thigh-extension plate 52 can include a first pair 54 of inner and outer extension tracks 24, 30 that are overmolded onto one or more portions of the first thigh-extension plate 52. A first thigh-extension slider 56 is engaged with the first thigh-extension plate 52, wherein the first thigh-extension slider 56 defines inner and outer grooves 32, 34 that slidably engage the inner and outer extension tracks 24, 30, respectively, of the first thigh-extension plate 52 to define a plurality of first thigh-extension positions 58. The vehicle seat 12 can also include a second thigh-extension plate 60 coupled to the seat frame 50, wherein the second thigh-extension plate 60 includes a second pair 62 of inner and outer extension tracks 24, 30 that are overmolded onto one or more portions of the second thigh-extension plate 60. A second thigh-extension slider 64 is engaged with the second thigh-extension plate 60. The second thigh-extension slider 64 defines inner and outer grooves 32, 34 that slidably engage the inner and outer extension tracks 24, 30, respectively, of the second thigh-extension plate 60, to define a plurality of second thigh-extension positions 66. It is contemplated that the first thigh-extension plate 52 and the first thigh-extension slider 56 define a right thigh extender 68 and the second thigh-extension plate 60 and second thigh-extension slider 64 define a left thigh extender 70.

Referring again to FIGS. 3-7, the first and second pairs 54, 62 of inner and outer extension tracks 24, 30 can include a low friction resin. The first pair 54 of inner and outer extension tracks 24, 30 are overmolded onto inner and outer edges 80, 82, respectively, of the first thigh-extension plate 52. The second pair 62 of inner and outer extension tracks 24, 30 are overmolded onto inner and outer edges 80, 82, respectively, of the second thigh-extension plate 60.

By overmolding the first and second pairs 54, 62 of inner and outer extension tracks 24, 30, the various extension tracks 16 can be secured to the corresponding thigh-extension plates 14, without the need for additional fasteners or connecting assemblies. Additionally, the extension tracks 16 can be secured thereto in a fully engaged configuration that is free of play or wobble between the extension tracks 16 and the corresponding thigh-extension plates 14. In this manner, smooth operation of the thigh-extension slider 18 along the extension track 16 can be maintained through the operational life of the vehicle seat 12. Additionally, the use of overmolding to directly attach the extension track 16 to the corresponding thigh-extension plate 14 decreases the number of operations to attach the extension tracks 16 to the corresponding thigh-extension plates 14 and also provide a more uniform manufacturing process such that manufacturing tolerances are kept to a minimum.

Referring again to FIGS. 2-7, the first and second pairs 54, 62 of inner and outer extension tracks 24, 30 are overmolded onto the respective first and second thigh-extension plates 52, 60 using a low friction resin, such as acetyl. Additionally, the first and second thigh-extension sliders 56, 64 are made of various materials that can include, but are not limited to, nylon, such as glass-filled nylon or various percentages of glass-filled nylon, such as approximately 15 percent glass-filled nylon. The use of glass-filled nylon as at least a portion of the first and second thigh-extension sliders 56, 64 provides a smooth sliding engagement with the acetyl material of the first and second pairs 54, 62 of inner and outer extension tracks 24, 30. Additionally, use of acetyl and the glass-filled nylon provides a robust structure for supporting portions of the right and left thigh-extenders 68, 70 during use by occupant of the vehicle seat 12.

Referring again to FIGS. 3-6, the right and left thigh extenders 68, 60 can include first and second motors 90, 92 that are engaged with the first and second thigh-extension sliders 56, 64, respectively. In such an embodiment, the first and second motors 90, 92 selectively and independently operate the first and second thigh-extension sliders 56, 64 between the pluralities of first and second thigh-extension positions 58, 66, respectively. Accordingly, each of the right and left thigh-extenders 68, 70 is selectively and independently operable between respective pluralities of thigh-extension positions 22. According to various aspects of the thigh extension 10, the right and left thigh-extenders 68, 70 may include first and second motors 90, 92 that can be screw-drive motors, or other type of motor similar to that described above.

Referring again to FIGS. 3-6, within each thigh-extension 10, the motor 40 can include a motor plate 100 that operates along a screw 102 of a screw-drive motor. The motor plate 100 is configured to couple with the thigh-extension slider 18 such that as the motor plate 100 moves along the screw 102 of the screw drive, the thigh-extension slider 18 similarly operates along the thigh-extension plate 14. The housing 104 of the motor 40, or other portion of the motor 40, can be coupled to the thigh-extension plate 14 such that as the motor plate 100 operates along the screw 102, the housing 104 of the motor 40 stays fixed in relation to the thigh-extension plate 14 such that the thigh-extension slider 18 can move along with the motor plate 100 during operation of the motor 40.

Referring again to FIGS. 3-6, the thigh-extension plate 14 can include a guide slot 110 within which the motor plate 100 operates to move the thigh-extension slider 18 between the plurality of thigh-extension positions 22. The guide slot 110 is configured to permit linear movement of the motor plate 100, and in turn, the thigh-extension slider 18. According to various embodiments, it is contemplated that the motor plate 100 can slide within the guide slot 110 that has a non-linear configuration to allow for non-linear movement of the motor plate 100 and also corresponding non-linear movement of the thigh-extension slider 18. In such an embodiment, it is contemplated that right and left thigh extenders 68, 70 can be manipulated between corresponding thigh-extension positions 22. An extended position 26 of a thigh-extension 10 may include an extension movement 120 away from the seat back and also an outward movement 122 away from a central axis 124 of the seat frame 50, such that as the right and left thigh extenders 68, 70 move to the respective extended positions 26, each of the thigh-extensions 10 moves away from a central axis 124 of the seat frame 50, thereby providing a wider supporting surface for occupants that may require longer thigh extensions and also wider thigh support provided by the seat proximate the right and left thigh extenders 68, 70. Other non-linear movements of the motor plate 100 and thigh-extension slider 18 are also contemplated, based upon the design of the vehicle and needs of the particular user of the vehicle.

As discussed above, motors 40 other than a screw drive can be used within the various aspects of the thigh-extensions 10 of the vehicle seat 12. Accordingly, when other motor types are used, the motor plate 100 can be coupled to a corresponding portion of the particular motor 40 used within the vehicle seat 12.

Referring again to FIGS. 2-7, the thigh-extension plate 14 can include a metallic member that is fixedly connected to the seat frame 50. In this manner, the thigh-extension plate 14 provides a secure and robust structure along which the thigh-extension slider 18 can operate between the plurality of thigh-extension positions 22. It is contemplated that the thigh-extension plate 14 can include a metallic panel that can made of various materials that include, but are not limited to, steel, aluminum, metallic alloys, composite materials, polymers, combinations thereof, and other similar rigid materials that can provide structural and robust support for the various thigh-extensions 10 of the vehicle seat 12. It is also contemplated that the thigh-extension plate 14 can be operably connected to the seat frame 50 such that movement of the thigh-extension plate 14 can correspond to various lateral, vertical and rotational movements of the thigh-extension 10 between the plurality of thigh-extension positions 22. Accordingly, operation of the motor 40 can serve to operate the thigh-extension slider 18 and/or the thigh-extension plate 14 with respect to the seat frame 50.

Referring again to FIGS. 1-7, the first and second thigh-extension sliders 56, 64 can include respective first and second thigh cushions 140, 142 that operate with the first and second thigh-extension sliders 56, 64. Accordingly, the first and second thigh cushions 140, 142 further define the respective pluralities of first and second thigh-extension positions 58, 66. It is also contemplated that a single cushion can extend over both of the first and second thigh-extension sliders 56, 64 where the single cushion can include a flexible central portion that allows for non-symmetrical movement of the first and second thigh-extension sliders 56, 64. It is also contemplated that a single cover member can extend over either a single cushion or the separate first and second thigh cushions 140, 142. Alternatively, each of the first and second thigh cushions 140, 142 can include a separate cover member that extends over and covers each of the right and left thigh-extenders 68, 70.

Referring now to FIGS. 1-8, having described various aspects of the thigh-extension 10 for a vehicle seat 12, a method 400 is disclosed for forming various aspects of the thigh-extension 10 for the vehicle seat 12. According to the method 400, a resin is overmolded onto a metallic thigh-extension plate 14 to define inner and outer extension tracks 24, 30 (step 402). The metallic thigh-extension plate 14 can be placed into a mold and the low friction resin, such acetyl, can be molded around portions of the metallic thigh-extension plate 14. Such molding techniques can include, but are not limited to, injection molding, compression molding, blow molding and other similar molding techniques for connecting a formable material to a metallic substrate. After the inner and outer extension tracks 24, 30 are overmolded, a nylon thigh-extension slider 18 can be slid onto the inner and outer extension tracks 24, 30 (step 404). As discussed above, various aspects of the thigh-extension slider 18 can include inner and outer grooves 32, 34 that slidably engage the inner and outer extension tracks 24, 30, respectively. After the thigh-extension slider 18 is mounted onto the inner and outer extension tracks 24, 30, a motor 40 can be attached to the metallic thigh-extension plate 14 and the nylon thigh-extension slider 18 (step 406). As discussed above, the motor 40 serves to selectively operate the nylon thigh-extension slider 18 between the plurality of thigh-extension positions 22 relative to the metallic thigh-extension plate 14.

Referring again to FIGS. 1-8, the housing 104 of the motor 40 can be attached to the thigh-extension plate 14 and the motor plate 100 can be attached to the thigh-extension slider 18. In order to guide the movement of the thigh-extension slider 18 as a result of operation of the motor 40, a guide linkage 150 can extend from a portion of the thigh-extension plate 14 to an operating member 152 coupled to the thigh-extension slider 18. In various embodiments, the guide linkage 150 can include an internal channel 154 that engages the operating member 152 and serves to limit the extension and outward movements 120, 122 of the thigh-extension slider 18 with respect to the thigh-extension plate 14. Accordingly, the operating member 152, when it reaches an extended position 26, engages a portion of the guide linkage 150 such that the guide linkage 150 stops additional extension and/or outward movements 120, 122 of the operating member 152, away from the thigh-extension plate 14. It is also contemplated that the guide linkage 150 can be coupled to at least one of the inner and outer extension tracks 24, 30 such that the guide linkage 150 is rotationally and/or slidably connected to the inner and/or outer extension tracks 24, 30. It is contemplated that the engagement of the guide linkage 150 and the operating member 152 can also guide the extension and outward movements 120, 122 of the thigh-extension slider 18 to account for both linear and non-linear motion of the thigh-extension slider 18. After the motor 40 is connected to the thigh-extension plate 14 and the thigh-extension slider 18, the metallic thigh-extension plate 14 can be attached to the seat frame 50 for positioning within a portion of the vehicle seat 12 (step 408).

According to the various embodiments, various controls can be attached to the first and second motors 90, 92 for the right and left thigh-extenders 68, 70. Such controls can be coupled with a user interface attached to either the vehicle seat 12, a central console of the vehicle, or other control disposed within a portion of the passenger cabin. It is also contemplated that the motors 40 can be operated in conjunction with other controls of the vehicle seat 12. By way of example, and not limitation, when the seat back is moved to a reclined position, the first and second motors 90, 92 can at least partially operate the right and left thigh-extenders 68, 70 at least partially outward. Other cooperative movements of the vehicle seat 12 are also contemplated.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A vehicle seat comprising:
a seat frame;
a first thigh-extension plate coupled to the seat frame, wherein the first thigh-extension plate is metallic and includes an overmold that includes a first pair of inner and outer extension tracks, wherein the overmold is overmolded onto a portion of the first thigh-extension plate; and
a first thigh-extension slider engaged with the first thigh-extension plate, wherein the first thigh-extension slider defines inner and outer grooves that slidably engage the inner and outer extension tracks, respectively, of the overmold of the first thigh-extension plate to define a plurality of first thigh-extension positions.

2. The vehicle seat of claim 1, further comprising:
a second thigh-extension plate coupled to the seat frame, wherein the second thigh-extension plate includes a second pair of inner and outer extension tracks overmolded onto a portion of the second thigh-extension plate; and
a second thigh-extension slider engaged with the second thigh-extension plate, wherein the second thigh-extension slider defines inner and outer grooves that slidably engage the second pair of inner and outer extension tracks, respectively of the second thigh-extension plate to define a plurality of second thigh-extension positions, wherein the first thigh-extension plate and first thigh-extension slider define a right thigh extender, and wherein the second thigh-extension plate and second thigh-extension slider define a left thigh extender.

3. The vehicle seat of claim 2, further comprising:
first and second motors engaged with the first and second thigh-extension sliders, respectively, wherein the first and second motors selectively and independently operate the first and second thigh-extension sliders between the pluralities of first and second thigh-extension positions, respectively.

4. The vehicle seat of claim 2, wherein the first and second pairs of inner and outer extension tracks include a low-friction resin, and wherein the first pair of inner and outer extension tracks are overmolded on inner and outer edges, respectively, of the first thigh-extension plate, and wherein the second pair of inner and outer extension tracks are overmolded on inner and outer edges, respectively, of the second thigh-extension plate.

5. The vehicle seat of claim 4, wherein the low-friction resin is acetyl.

6. The vehicle seat of claim 2, wherein the first and second thigh-extension sliders are made of glass-filled nylon.

7. The vehicle seat of claim 3, wherein the first and second motors are screw-drive motors.

8. The vehicle seat of claim 2, wherein the first and second thigh-extension plates are metallic plates that are fixedly connected to the seat frame.

9. The vehicle seat of claim 2, wherein the first and second thigh-extension sliders include respective first and second thigh cushions that operate with the first and second thigh-extension sliders to further define the respective pluralities of first and second thigh-extension positions.

10. A thigh-extension for a vehicle seat comprising:
a metallic thigh-extension plate;
an extension track defined by a low-friction resin overmolded onto the metallic thigh-extension plate, the low-friction resin forming inner and outer extension tracks; and
a thigh-extension slider that includes integral inner and outer grooves that slidably engage with the inner and outer extension tracks that are made of the low-friction resin that is overmolded onto the metallic thigh-extension plate.

11. The thigh-extension of claim 10, wherein the low-friction resin is acetyl.

12. The thigh-extension of claim 10, wherein the thigh-extension slider includes glass-filled nylon.

13. The thigh-extension of claim 12, wherein the thigh-extension slider includes 15 percent glass-filled nylon.

14. The thigh-extension of claim 10, wherein the thigh-extension plate is fixedly connected to a seat frame.

15. The thigh-extension of claim 10, further comprising:
a screw-drive motor coupled to the thigh-extension slider and the thigh-extension plate, wherein the motor selectively operates the thigh-extension slider between the plurality of thigh-extension positions relative to the thigh-extension plate.

16. A method of forming a thigh-extension for a vehicle seat, the method comprising steps of:
overmolding a low-friction resin onto a metallic thigh-extension plate to define inner and outer thigh-extension tracks;
sliding a nylon thigh-extension slider onto the inner and outer thigh-extension tracks, wherein the nylon thigh-extension slider includes inner and outer grooves that slidably engage the inner and outer extension tracks, respectively; and
attaching the metallic thigh-extension plate to a seat frame.

17. The method of claim 16, further comprising a step of:
attaching a motor to the metallic thigh-extension plate and the nylon thigh-extension slider, wherein the motor selectively operates the nylon thigh-extension slider between a plurality of thigh-extension positions relative to the metallic thigh-extension plate.

18. The method of claim 16, wherein the low-friction resin is acetyl, and wherein the nylon thigh-extension slider includes glass-filled nylon.

19. The method of claim 16, further comprising:
attaching an adjacent metallic thigh-extension plate to the seat frame, where the metallic thigh-extension plate and the adjacent metallic thigh-extension plate at least partially define left and right operable thigh-extensions.

\* \* \* \* \*